R. H. CHALK.
VALVE.
APPLICATION FILED JUNE 19, 1908.
927,326.
Patented July 6, 1909
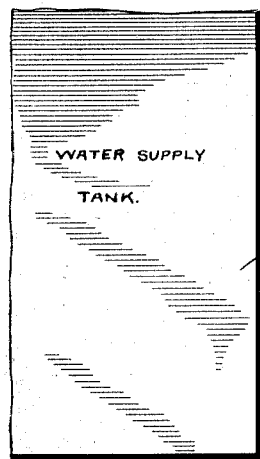
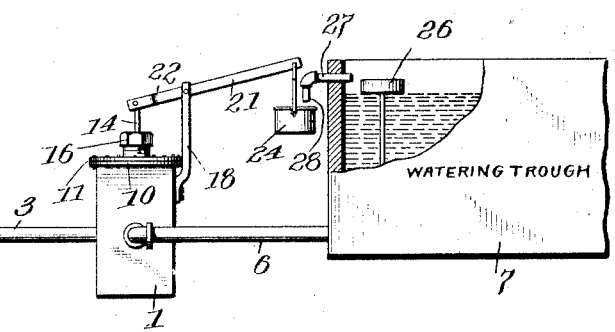
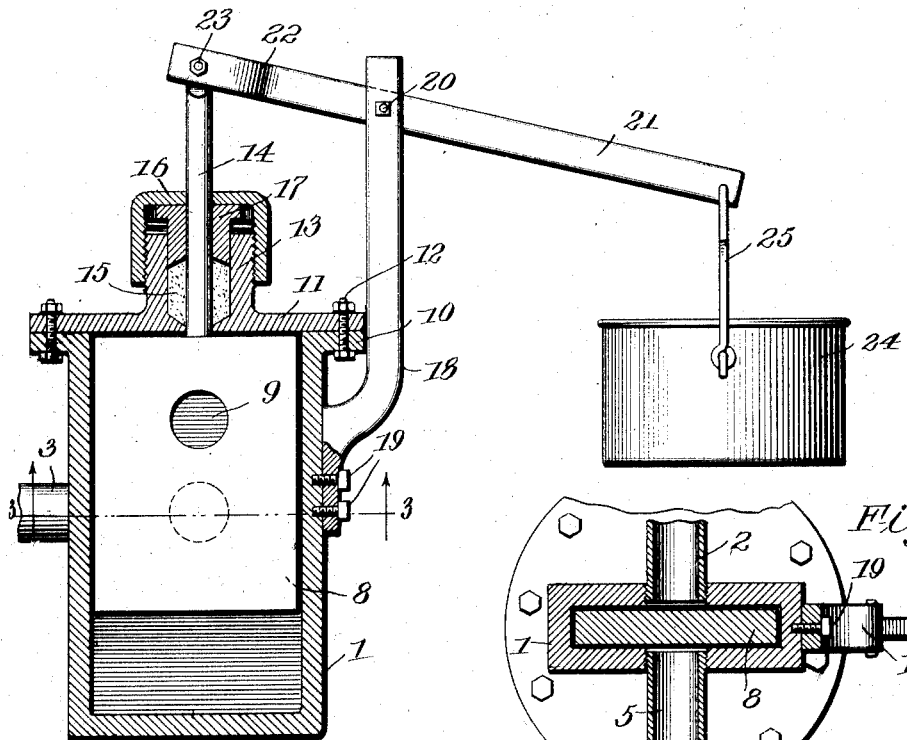
WITNESSES
INVENTOR
RUSSELL H. CHALK
BY
ATTORNEYS

UNITED STATES PATENT OFFICE.

RUSSELL H. CHALK, OF SONORA, TEXAS.

VALVE.

No. 927,326.  Specification of Letters Patent.  Patented July 6, 1909.

Application filed June 19, 1908. Serial No. 439,369.

*To all whom it may concern:*

Be it known that I, RUSSELL H. CHALK, a citizen of the United States, and a resident of Sonora, in the county of Sutton and State of Texas, have invented certain new and useful Improvements in Valves, of which the following is a specification.

My invention is an improvement in valves, and consists in certain novel constructions and combinations of parts hereinafter described and claimed.

Referring to the drawings which form a part hereof—Figure 1 is a diagrammatic view of the water supply tank and the watering trough with the valve in position, Fig. 2 is a central longitudinal section of the valve, and Fig. 3 is a section on the line 3—3 of Fig. 2.

The present embodiment of my invention comprises a valve casing 1, substantially rectangular in cross section, and having on one side an inlet 2 connected by a pipe 3 with the water supply tank 4, and on the other with an outlet 5 connected by a pipe 6 with the water trough 7. The inlet 2 is in alinement with the outlet 5, and a valve 8 is movable vertically in the casing, the said valve being rectangular in cross section to correspond with the cross section of the casing, and being provided with an opening 9 therethrough, which when the valve is in its lowermost position is adapted to place the inlet 2 and the outlet 5 in communication with each other.

The casing is provided with a circular flange 10, and a circular cover 11, is arranged on the top of the casing, the said cover being secured to the flange by means of bolts 12. The cover is provided at approximately its center with an opening encircled by a nipple 13, the stem 14 of the valve passing through the opening and the nipple, a packing 15 being arranged between the nipple and the stem. The nipple is externally threaded, and a packing nut 16 is engaged therewith, the packing nut having a portion 17 extending into the nipple for compressing the packing.

A bracket 18 is secured to one end of the casing by means of screws 19, and to the upper end of the bracket is pivoted as at 20, a lever 21, having at its inner end a yoke 22, between the arms of which the stem is pivoted as at 23, and a cup 24 is provided with a bail 25, which is connected with the free end of the lever. The water trough is provided with the usual float valve 26, and an overflow pipe 27 is arranged near the upper edge of the trough, the overflow pipe being provided with a depending portion 28 discharging into the cup 24 as shown in Fig. 1.

The operation of the device is as follows: As long as the float valve operates properly, the water will be shut off whenever the float is in the position shown in Fig. 1. Should this device fail to operate for any reason, the trough will soon fill up with water, which passing out through the overflow pipe 27 will enter the cup 24, and when the cup is full, the lever 21 will swing into the position shown in Fig. 2, thus cutting off the inlet 2, from the outlet 5, and stopping the flow of water until the trouble is remedied.

I claim:

1. The combination with a water supply tank, a watering trough connected therewith, and a float valve controlling said connection, of an auxiliary valve interposed in the connection between the supply tank and the watering trough, the said valve comprising a casing, provided with oppositely arranged alined inlet and outlet openings, a valve slidable in the casing, and having an opening normally registering with the inlet and outlet, a stem on the valve, a bracket on the casing, a lever pivoted on the bracket, and having one end connected with the stem, a cup connected with the other end of the lever, said cup being arranged adjacent to the watering trough, the watering trough having an overflow pipe whose outlet is arranged above the cup.

2. The combination with a water supply tank, and a watering trough connected therewith, and a float valve for controlling said connection, of a valve casing interposed in the said connection, a valve movable in the casing and normally out of position to close the connection, a pivotally mounted lever having one end connected with the valve, a cup on the other end, and an overflow pipe in connection with the watering trough to discharge into the cup.

RUSSELL H. CHALK.

Witnesses:
 LOUIS J. WARDLAW,
 BART C. DE WITT.